June 2, 1931. P. T. ROBIN 1,807,636
COUPLING
Filed Aug. 11, 1930 2 Sheets-Sheet 1

INVENTOR
PHILIP T. ROBIN
BY John A. Brummhardt
ATTORNEY

June 2, 1931.  P. T. ROBIN  1,807,636

COUPLING

Filed Aug. 11, 1930  2 Sheets-Sheet 2

INVENTOR
PHILIP T. ROBIN
BY
ATTORNEY

Patented June 2, 1931

1,807,636

UNITED STATES PATENT OFFICE

PHILIP T. ROBIN, OF ERIE, PENNSYLVANIA

COUPLING

Application filed August 11, 1930. Serial No. 474,442.

My invention relates to couplings and aims to provide a device of this character particularly adapted for use in connection with equipment in which a rapid and positive means for connecting or disconnecting certain related parts is an essential to proper operation.

The said device comprises two principal units, one male and the other female. In this specification the former unit is hereafter referred to as a plunger and the latter unit as a fitting.

When the said plunger and fitting are connected and locked together by means hereinafter described, they are adapted to resist forces tending to separate them in a longitudinal, or axial direction.

An essential feature of the invention is a locking mechanism associated with the said plunger and which, when actuated by a manual or other force exterior to the coupling proper, provides a rapid and positive means for maintaining the plunger and fitting in engagement or for releasing the same to permit disengagement, as may be desired. The nature of the said locking means is such that it will tighten its grip upon application of and in direct proportion to any force which may tend to disengage the coupling while in locked position.

The device may be employed as a straight mechanical coupling such as, for example, a drawbar to attach railroad cars or other vehicles to one another; or it may be adapted to the transmission of fluids under pressure from one container to another under circumstances requiring frequent connection and disconnection of the same.

Where the coupling is to be used for transmission of fluids, both plunger and fitting are of hollow construction and provided with ducts to permit passage of the fluid; and the locking means is constructed of a material suitable for effecting a fluid seal between the same.

Pressure in the fluid being transmitted constitutes a force tending to drive the plunger and fitting apart and, as heretofore described, will therefore cause the locking means to tighten its contact with both the plunger and the fitting, thus constituting a fluid seal which will automatically develop increased resistance to leakage in direct proportion to a rise of fluid pressure in the coupling.

The facility with which it may be engaged or disengaged, together with its ability to transmit fluid under high pressure without leakage, make the coupling particularly useful in connection with systems for lubricating the bearings of certain classes of machinery or of the chassis of automobiles or the like, in which relatively great fluid pressures are necessary in order to force lubricant through the restricted passages and outlets frequently encountered in such cases.

Having thus described the principal features and objects of my invention, reference may be had to the drawings which show several forms of the device and in which:

Figure 1:
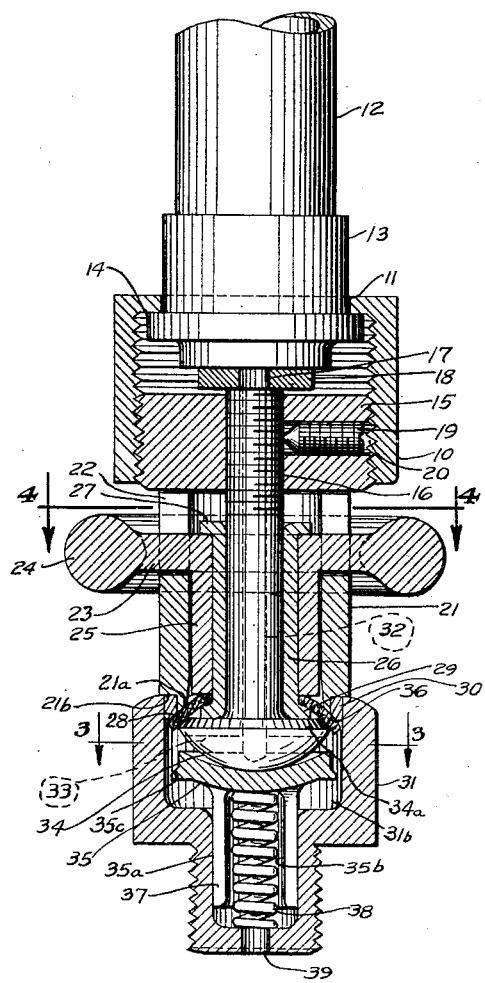
Fig. 1 is a sectional view of the plunger and fitting in locked position.

Referring to the drawings: 12 indicates a tube, or pipe, through which fluid may be passed and which is attached at one end to the sleeve 13, having a flange 14. The threaded sleeve 10 has a bore 11, adapted to receive the sleeve 13. The plug 15 is provided with an external thread to engage the threaded portion of the sleeve 10; and an internal thread to receive the threaded portion of the plunger stem 16, the same being held in the proper position by means of a set screw 19 turned into the threaded aperture 20 in the plug 15.

A sleeve 21 is slotted at 22 for the arms 23, which serve to connect the operating ring 24 to the longitudinal cylinder 25, which fits around the inner sleeve 26. The flange 29 is preferably pre-formed on the sleeve 26 and serves to hold the flexible locking collar 28 against the lower end surface of sleeve 25. The flange 27 is preferably made on the sleeve 26 after the same has been assembled, with the flexible collar 28, into the sleeve 25. A washer 18, containing a hole 17, is interposed between the plunger stem 16 and the flanged sleeve 13. The plunger stem 16 is provided with a longitudinal duct 32 which connects with the transverse duct 33 in the plunger head 34, thus providing for a continuous passage of fluid from the tube 12 to the exterior of the plunger head 34.

The inner surface of the lower end of the sleeve 21 is tapered outward slightly as shown at 21a, in order to provide a sheath into which the flexible collar 28 may be withdrawn when required. The outer end surface of sleeve 21 is reduced in diameter to form a shoulder 21b to limit the entry of the sleeve 21 into the fitting 31.

Figure 2:
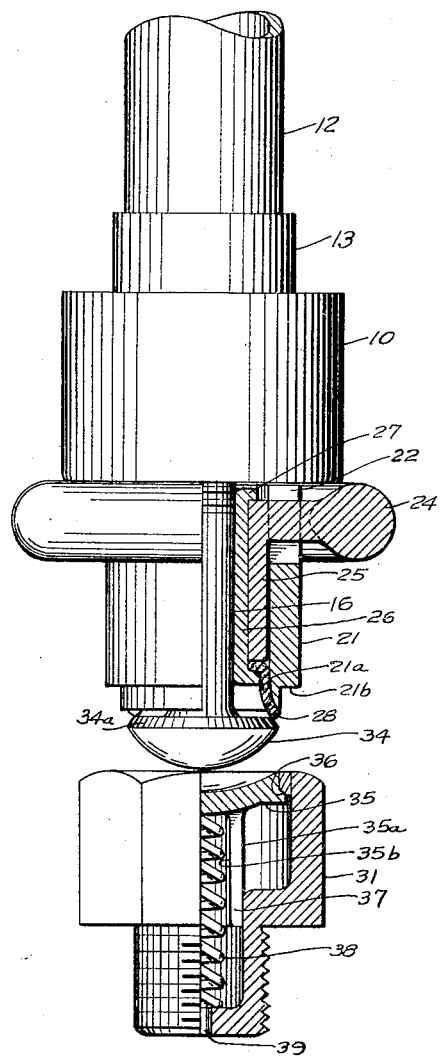
Fig. 2 is a partial sectional view similar to Fig. 1, but with the plunger and fitting disengaged.
Figure 3:
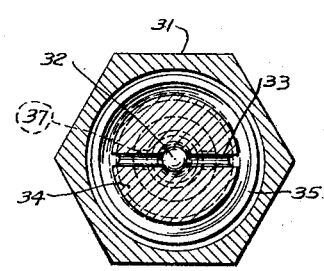
Fig. 3 is a section taken on line 3—3 of Fig. 1.
Figure 5:
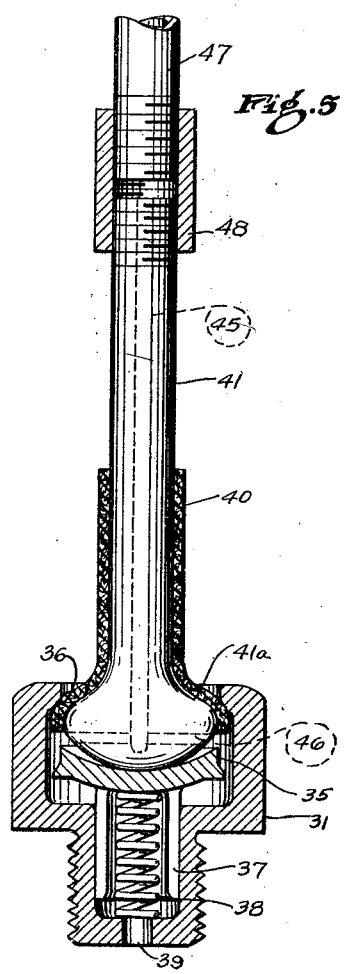
Fig. 5 is a sectional view of a modified form of the invention, being more simple in construction and shown with the plunger and fitting in the engaged and locked position.

The fitting 31 is provided with a bore 31b in which, at its upper end the lip 30 is fixedly placed. The inner diameter of the lip 30 is only slightly greater than the largest diameter of the plunger head 34, so that the latter may only enter the fitting 31 through the lip 30 when the flexible collar 28 is withdrawn into its sheath, as shown in Fig. 2. The lower edge of the lip 30 has a beveled seat 36 and when it is desired to lock the coupling the flexible collar 28 is extruded so as to be placed between the beveled seat of the lip 30 and the beveled surface 34a of the plunger head 34.

A check valve 35 is preferably provided in the fitting 31 to prevent escape of fluid from the fitting after the plunger has been withdrawn; and also to guard against the entry of grit or other foreign substance into the fitting while the coupling is disengaged. The check valve 35 has a beveled seat 35c which is adapted to engage the seat 36 when actuated by the expansion spring 38. Slots 37 are provided in the cylindrical guide surface 35a of the check valve 35 to permit the passage of fluid from the main bore 31b into the hollow 35b and thence through the aperture 39 into any receptacle to which it may be desired to transmit the fluid. It will be observed that the greatest diameter of the check valve 35 is somewhat smaller than the bore 31b of the fitting 31, so as to permit free passage of the fluid around the head of the check valve when the same is in the position shown in Fig. 1. The fitting 31 has a hexagonal head and a threaded base to facilitate its attachment to the receptacle heretofore described.

In operation the operating ring 24 is placed in the position relative to the plunger shown in Fig. 2, so that the inner sleeve 26 will draw the flexible collar 28 into its sheath 21a until its greatest diameter becomes less than that of the plunger head 34. The plunger unit may then be entered into the fitting until the shoulder 21b comes in contact with the upper surface of the lip 30. Incidentally, the entry of the plunger head 34 into the fitting will automatically depress the check valve 35 and the spring 38. Next, the operating ring 24 may be moved toward the fitting with the result that the flexible collar 28 will be extruded from its sheath 21a and forced between the seat 36 of the lip 30 and the seat 34a of the plunger head 34, all as shown in Fig. 1. It will now be seen that it is impossible for the plunger to be retracted from the fitting without compressing the material of the flexible collar 28 to the point where it could be drawn through the exceedingly small clearance space which exists between the greatest diameter of the plunger head 34 and the inner diameter, or bore, of the lip 30. And since the material of which the flexible collar is composed is of such a nature and size that it cannot be compressed into the said clearance space, the plunger unit will be positively locked to the fitting and, it will be readily appreciated, the greater the force tending to separate the plunger from the fitting the tighter the flexible collar will become wedged between the seats 36 and 34a. It will also be seen that the spring 38 will act to maintain a certain amount of pressure on the flexible collar 28 so that the latter will not be in danger of becoming loosened in the fitting should the main force acting on the coupling be temporarily relaxed.

When it is desired to disengage the coupling, the force that has been applied, fluid or otherwise, must be relaxed. Then, by moving the plunger head still farther into the fitting, pressure of the seat 34a on the surface of the flexible collar 28 will be released and the latter may be withdrawn into its sheath 21a by manipulation of the operating ring 24 into a position relative to the plunger as shown in Fig. 2, after which the entire plunger assembly may readily be removed from the fitting and the spring 38 will close the check valve 35.

Figure 6:
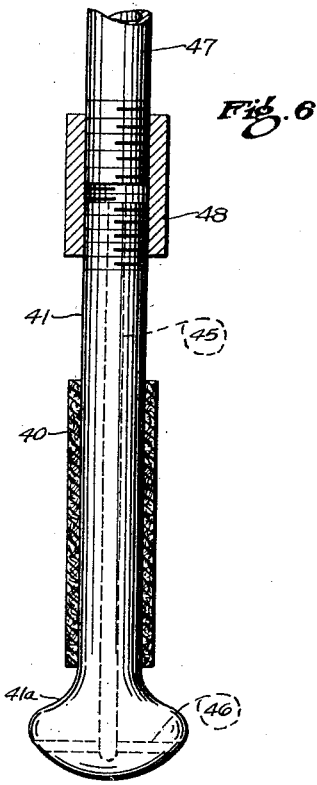
Fig. 6 is a view similar to Fig. 5 but with the plunger and fitting disengaged.
Figure 4:
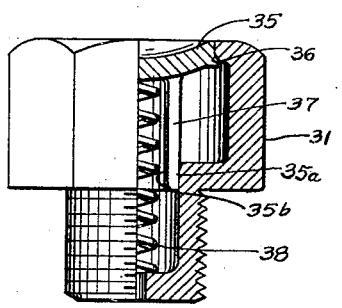
Fig. 4 is a section taken on line 4—4 of Fig. 1.
Figure 4:
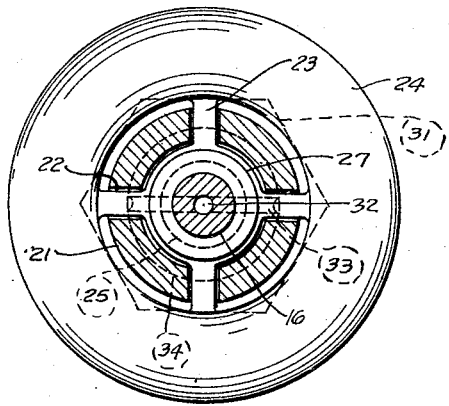

The modified form is similar in operation. The pipe 47 is connected to the plunger stem 41 by means of the pipe coupling 48. The flexible collar 40 is composed of an elastic material and slidably positioned on the stem of the plunger, as shown in Fig. 6. After the plunger head 41a has been inserted into the fitting 31 the flexible collar 40 may be moved toward the fitting until its lower end is expanded over the plunger head as shown and enters the space between the seat 36 of the fitting and the seat 41a of the plunger head. Passage of fluid through the longitudinal duct 45 of the plunger stem and the transverse duct 46 in the plunger head, and the general characteristics of the coupling are the same as heretofore described as pertaining to the first application.

Figure 7:
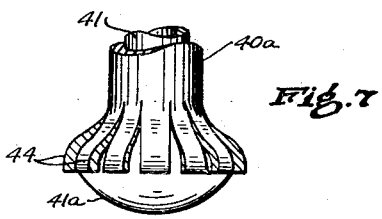
Fig. 7 is a fragmentary view of the plunger with a locking means consisting of a split, metallic collar, as a modification to permit the coupling to transmit excessively heavy mechanical loads without risk of damage to the locking means.

In the form shown in Fig. 7 the sleeve 40a is made of metal and its lower end is split to form a plurality of spring fingers 44 which can be expanded to lock the coupling when pushed down over the head 41a.

It will be noticed that in all forms illustrated the flexible lock collar must be withdrawn from the plunger head in order that the latter may be inserted into the fitting and that, after the plunger has been inserted and the flexible collar projected to lock the coupling, the latter will be securely maintained in the locked position because of the impossibility of the flexible collar being drawn through the limited space between the outside of the plunger head and the bore of the internal lip at the mouth of the fitting. Also, the greater the force applied to the coupling the tighter the flexible collar will become wedged in place, resulting in increased resistance to either mechanical slippage or fluid leakage. And, upon release of the force carried by the coupling, the flexible collar may be quickly and easily withdrawn and reduced to a diameter smaller than that of the outside of the plunger head, after which the entire plunger unit may be retracted from the fitting without effort.

Obviously, numerous other modifications of structure might readily be resorted to without in the least departing from the spirit of my invention.

I claim:

1. In a pressure coupling, the combination of a fitting having an inwardly opening check valve therein, a detachable coupling member having a head which may be pressed into the fitting to open the valve, said member having a fluid passage through the same, and an expansible sealing ring movable along the member and expanded by the head into sealing contact with the inside of the fitting.

2. The combination stated in claim 1, the fitting having an inner valve seat against which the ring is pressed by fluid pressure within the fitting, when the valve is unseated.

3. The combination stated in claim 1, said member including a hollow body engageable with the fitting, and a sleeve slidable inside the body, to which sleeve the ring is attached.

4. In a pressure coupling, the combination of a fitting having an inwardly opening check valve therein, a coupling plunger having a head which may be entered into the fitting to unseat the valve, said plunger and head having a fluid passage therethrough, a cylindrical body extending around the plunger and adapted to be applied to the fitting, an expansible ring extending around the plunger and shiftable forwardly around the head to be expanded thereby into contact with the inside of the fitting, and a sleeve between the plunger and body, to which the ring is attached, the sleeve being movable lengthwise of the plunger to advance the ring to expanded position.

In testimony whereof, I do affix my signature.

PHILIP T. ROBIN.